W. LITTLEJOHN.

BAGASSE FURNACE.

No. 9,996. Reissued Jan. 3, 1882.

Witnesses:
B. Carlyle Fenwick
Robt. L. Fenwick

Inventor.
William Littlejohn
by his Attys
Mason Fenwick & Lawrence

W. LITTLEJOHN.

BAGASSE FURNACE.

No. 9,996. Reissued Jan. 3, 1882.

Witnesses:
P. Carlyle Fenwick
Robt. C. Fenwick

Inventor
William Littlejohn
by his Attys
Mason Fenwick & Lawrence

W. LITTLEJOHN.

BAGASSE FURNACE.

No. 9,996. Reissued Jan. 3, 1882.

Witnesses:
B. Carlyle Fenwick
Robt. L. Fenwick

Inventor
William Littlejohn
by his Attys
Macomber Fenwick & Lawrence

4 Sheets—Sheet 4.

W. LITTLEJOHN.

BAGASSE FURNACE.

No. 9,996. Reissued Jan. 3, 1882.

Witnesses:
B. Carlyle Fenwick
Robt. L. Fenwick

Inventor:
William Littlejohn
by his attys
Mason Fenwick & Lawrence

UNITED STATES PATENT OFFICE.

WILLIAM LITTLEJOHN, OF NEW ORLEANS, LOUISIANA.

BAGASSE-FURNACE.

SPECIFICATION forming part of Reissued Letters Patent No. 9,996, dated January 3, 1882.

Original No. 208,476, dated October 1, 1878. Application for reissue filed December 3, 1881.

*To all whom it may concern:*

Be it known that I, WILLIAM LITTLEJOHN, a citizen of the United States, residing at New Orleans, parish of Orleans, and State of Louisiana, have invented a new and useful Improvement in Bagasse Burners or Furnaces, which improvement is fully set forth in the following specification and accompanying drawings, in which latter—

Figure 1:
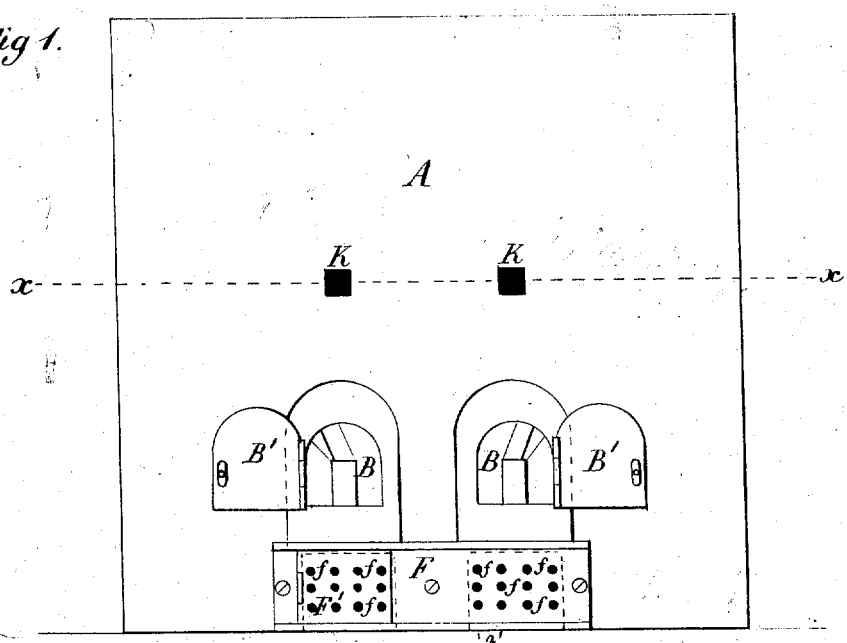
Figure 2:
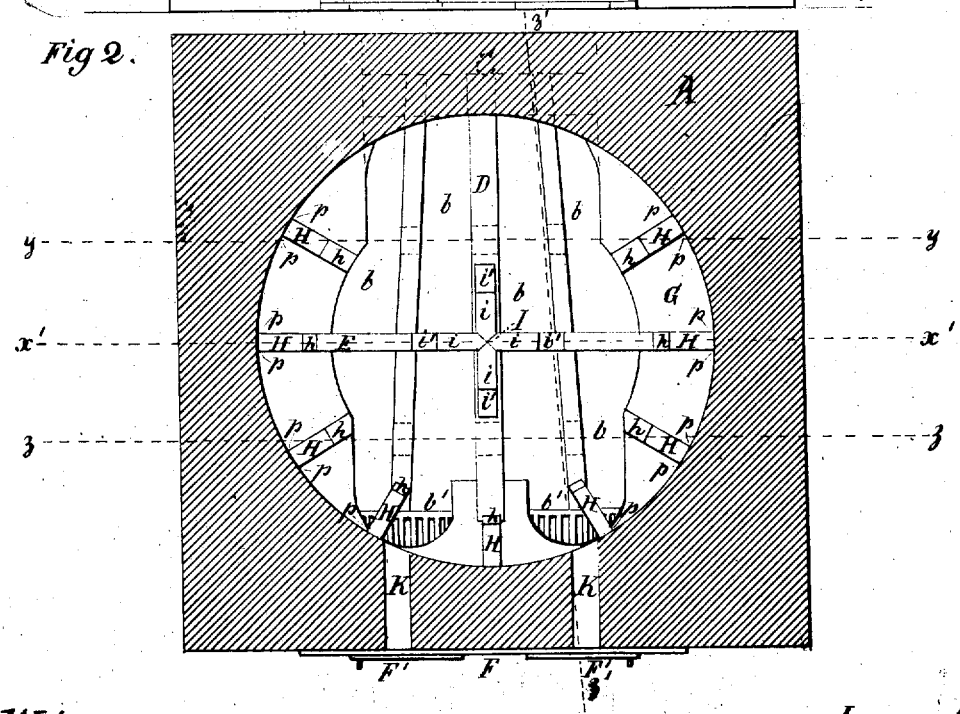
Figure 3:
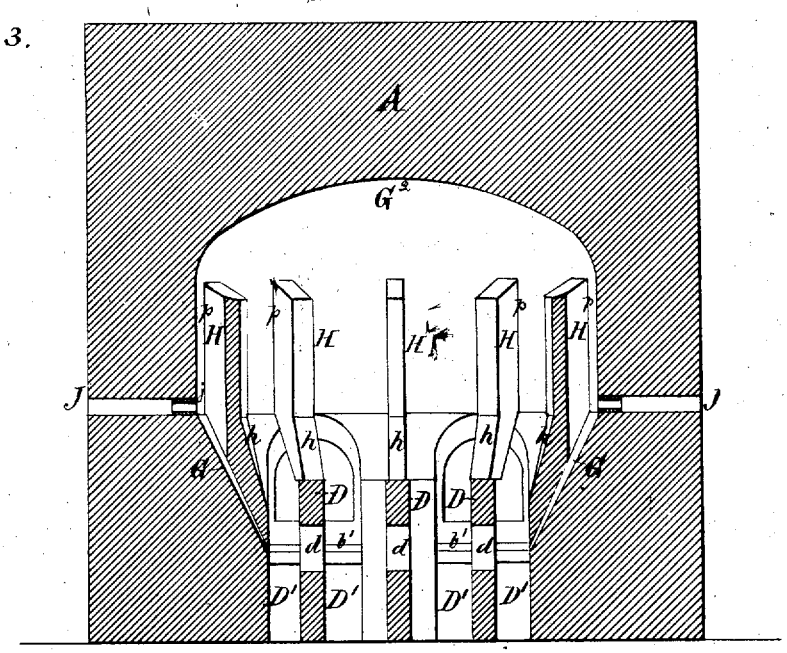
Figure 4:
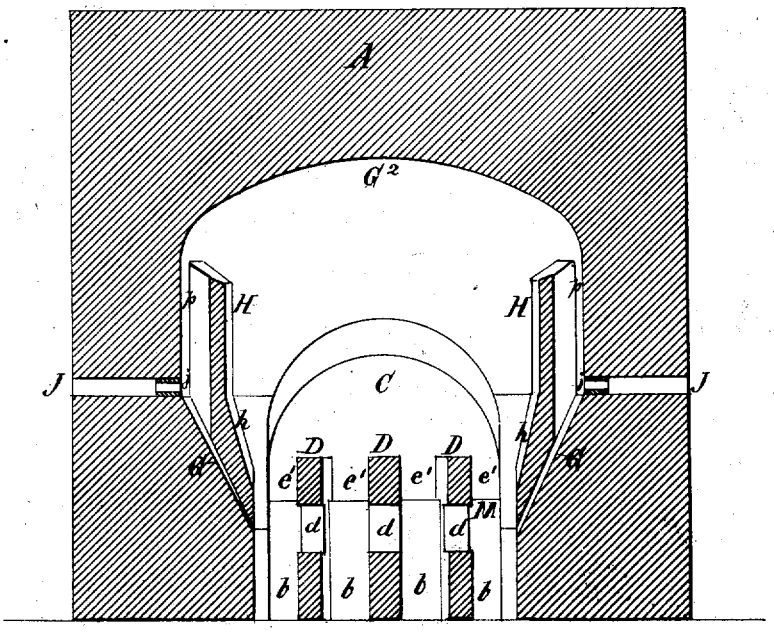
Figure 5:
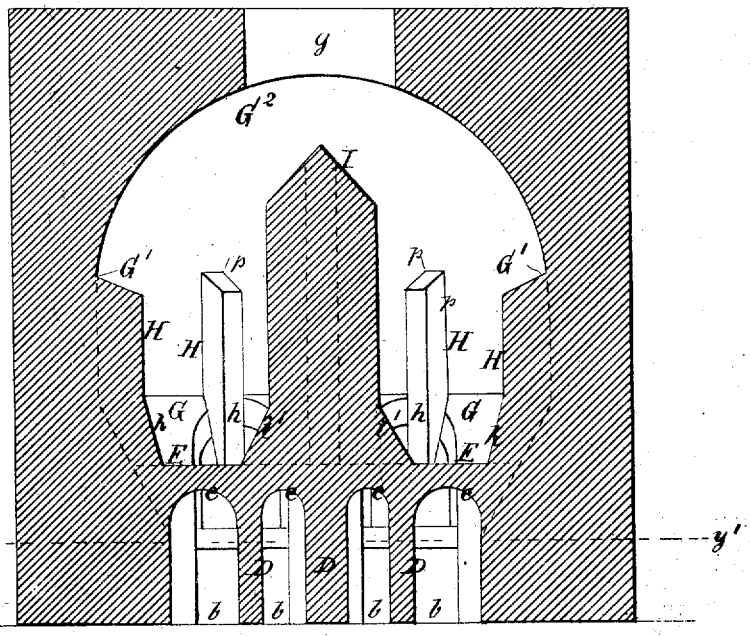
Figure 6:
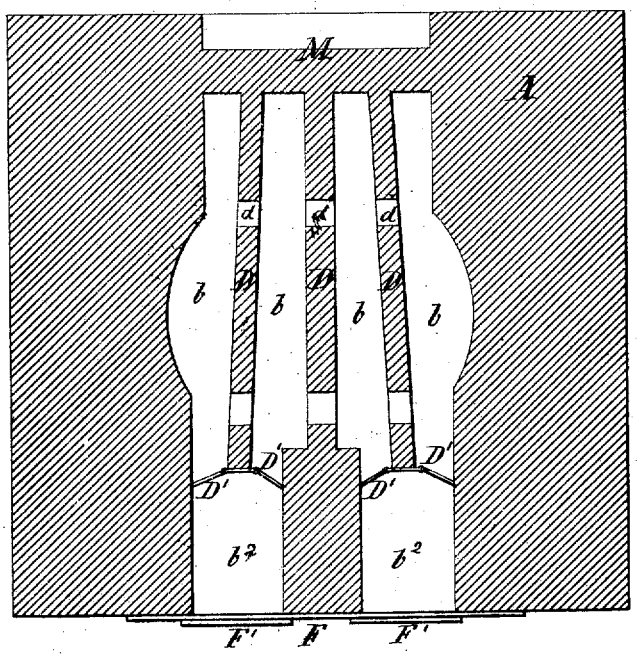
Figure 7:
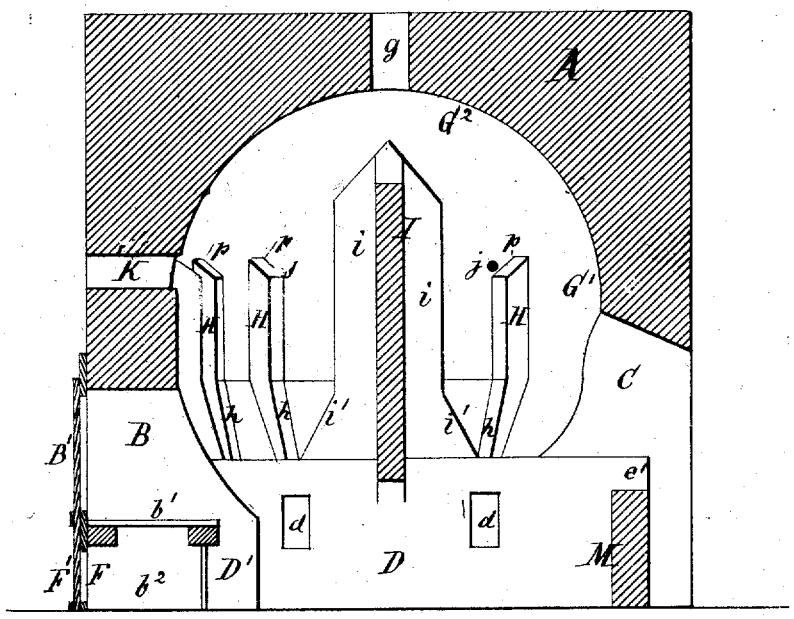

Figure 1 is a front elevation of my bagasse-furnace. Fig. 2 is a horizontal section in the line *x x* of Fig. 1. Fig. 3 is a vertical section in the line *y y* of Fig. 2, looking to the front. Fig. 4 is a vertical section in the line *z z* of Fig. 2, looking backwardly. Fig. 5 is a vertical central section in the line *x' x'* of Fig. 2, and Fig. 6 is a horizontal section in the line *y' y'* of Fig 5. Fig. 7 is a vertical section in the line *z' z'*.

My invention relates to a bagasse-furnace which burns bagasse above a grated bed and within the chamber into which the wet bagasse is placed, in contradistinction to that class of bagasse-furnace which expels the moisture from the bagasse by hot air circulated through and about the wet bagasse by means of a fire immediately beneath a grate, and then proposes to burn the gases in a mixing-chamber immediately at the bridge-wall of the boiler-furnace, the fuel for effecting this operation being the dried and charred bagasse, together with a large quantity of wood or coal, and the same being allowed to drop down through the grate upon the hearth of the pit beneath the grate and there caused to burn.

The nature of my invention consists in certain constructions, combinations, and arrangements of parts, hereinafter fully described and specifically claimed, whereby a bagasse-furnace is produced which burns the bagasse freely, rapidly, and perfectly, and with such regularity and economy that it may be advantageously used for manufacturing purposes, such as heating steam-boilers and similar contrivances.

In the drawings, A represents a structure of brick or masonry, forming the outer part of the furnace. It resembles a cube in shape; but it may be round, with spherical top, or of any other suitable shape. It has two front openings, B, and one large rear opening, C.

The interior of the furnace consists of an ash pit and bagasse combustion-chamber. The ash-pit is divided longitudinally between the openings B and C into chambers *b* by walls D, so arranged that the middle one is on the center line of the furnace and those to the right and left rise each in a central position at the openings B. The said walls D are connected by a central transverse arched bridge, E, having passages *e* between the walls D, and also between said walls and the interior surface of the furnace-wall, for the passage of the flame into the bagasse combustion-chamber. Passages *e'* are also provided between these walls and over the back wall, M, for the circulation of the flame toward the opening C, leading to flues beneath boilers.

About midway between the bridge E and their terminations the walls D are provided with openings *d*, whereby the chambers *b* are laterally connected. The openings *d* connect the spaces *b* laterally, and thus insure a more perfect circulation of flame and air; but these openings are not absolutely necessary, as the flame from the grates *b'* circulates on both sides of the wall D.

The openings B are provided with doors B' and grates *b'*, fastened in position at a suitable height and abutting against the front ends of the right and left walls D, which walls are much higher than the grates, in order to obtain the most advantageous arrangement between the fire upon the grates and the bagasse upon the walls D, as will be hereinafter shown. These grates are arranged respectively to supply flame on opposite sides of the walls D, as shown.

The rear part of the ash-pit $b^2$, below the grates *b'*, may be closed by swinging door D', suitably hung to the ends of the walls D, which doors, when closed, serve to prevent the draft of the ash-pit $b^2$ from entering the ash-pit *b b* of the main furnace when this is necessary.

The front of the ash-pit is provided with perforated doors F and slides F', with perforations *f*, which may be placed in any position with respect to each other, admitting more or less draft to the ash-pit by moving the slides accordingly.

From about the altitude of the grates *b'* the inner space of the furnace widens by means of an inverted conical step, G, above which it becomes cylindrical, as at G′, and spherical at the top $G^2$. A top opening, *g*, serves as a feed-hole, through which the bagasse is passed into the furnace.

The step G and wall G′ are provided with vertical columns H, two of which are supported by the walls D, so that they, in conjunction with the said walls, serve to divide the draft coming from the grate-chambers B. The columns H stand out from thirteen to eighteen inches, or thereabout, from that portion of the inner surface of the furnace-chamber which is above the grated bed formed by the walls D and the bridge E, and the spaces between these columns are about three feet, more or less, according to the diameter of the chamber above the grate, said spaces constituting portions of the chamber, into which the wet bagasse is passed and burned. The front and sides of the respective columns are broad and flat, the sides of the respective columns forming right angles with the front of the columns. The columns are constructed upon the front and sides of the inner surface of the chamber, above and below the grated surface formed by D and E, but not upon the back portion thereof. By making the columns to project out a considerable distance into said chamber and setting them a convenient distance apart, and by having them present a broad flat front edge, as well as sides which are at right angles to said front edge, a very important advantage is secured—to wit, the bagasse, as it accumulates in the combustion-chamber, while it falls against the wall of said chamber in all intermediate spaces between said columns, yet, as the columns are of rectangular shape and project far out into the chamber, the bagasse cannot fill up the corners or angles of the same next to the wall A, thus leaving at said corners, as at *p*, open passages or flues for the flame to ascend from the ash-pit below to set fire to and consume the bagasse adjacent to the wall of the chamber, which is the sole object of said columns.

In a furnace devised previously to my invention triangular projections from the inner surface of the bagasse combustion-chamber have been proposed for the purpose, as alleged, of preventing the air circulating round and round the interior of said chamber, and for so deflecting it that it may shoot across the bagasse combustion-chamber in all directions for the purpose of causing it to penetrate among all portions of the fuel, and also causing a thorough mixture of air with the gaseous products of combustion, so that, it is alleged, none escapes under the boiler unconsumed; but with columns of the shape described the object of my invention, so far as the columns are concerned, would be effectually defeated, because such triangular projections or columns with flat and obliquely-shaped sides could not possibly prevent the bagasse from packing all around them and in the corners so closely that the flames from the ash-pit would be completely obstructed.

In the center of the furnace, and upon the center wall, D, and the bridge E, a cruciform pinnacle, I, is erected, which is pointed at the top, so as to pierce and easily divide the bagasse falling down upon it through the feed-hole *g*.

The four vertical columns or wings *i* of the pinnacle are made flaring near the base, as at *i′*, in order the better to support said pinnacle, and that the partly-consumed bagasse may slide down on them without spreading and filling up the corner spaces of the pinnacle.

To avoid contracting the lateral depth of the columns H too rapidly toward their base, they are made slanting toward the center of the furnace, as indicated in the drawings at *h*, the slant corresponding nearly to the interior surface of the chamber in which the bagasse is burned.

The walls D and E serve as a coarse grating, upon which the bagasse falls and burns, and between which the ashes drop down into the divisions or chambers *b* of the ash-pit.

The furnace is at a suitable altitude provided with horizontal draft-holes J, which, in practice, will be provided with means whereby the draft is regulated, and which are, near the combustion-chamber, provided with linings of iron tubing of smaller diameter than the passage J, as seen at *j* in Figs. 3 and 4.

The front wall, above the opening B, is provided with two channels, K, of such size that a pole or rod may be introduced for the purpose of stirring up the burning bagasse in the furnace whenever it may become necessary. These channels or openings, when not used, are closed up by means of doors or their equivalents.

The walls D are toward the rear opening, C, laterally inclined to each other, so as to facilitate the cleaning of the chambers *b* through the ash-pit $b^2$ and doors D′. The inclining of the partitions in the manner shown causes the spaces or chambers to increase in width toward the doors D′, and thus the ashes can move outward more freely while being raked forward.

Bagasse is introduced into the bagasse combustion-chamber above the grated bed through the opening *g* until a sufficient quantity is accumulated upon the walls D. Wood or coal fires are then started upon the grates *b′*, and the doors D′ are closed to guide the draft from the ash-pit $b^2$ up through the grates *b′*. The fire upon the grate *b′* is kept up until it has communicated with the bagasse to such extent that the bagasse burns freely and independently of the fires on the grates *b′*, whereupon the said fires are either allowed to go out or not kept up to same extent as at first. The doors F and D′ are now thrown open to admit fresh air into the chambers *b′*, which air rises partly through the bagasse and partly along the inner corners of the columns H and *i*, and thus effects a thorough consumption of the bagasse and the gases emanating therefrom, a portion of the circulating current passing off into passage C through the passages $e'$ $e'$. If more fresh air is desired to perfect the combustion in the furnace, the passages J are opened. The bagasse is continually passed into the furnace through the opening $g$. It drops upon the point of the pinnacle I, whereby it is pierced and pushed toward the interior of furnace, all around the pinnacle, in such manner that the inner corners of the columns H and $i$ are free of it and allow the draft to pass up unobstructed. The burning gases pass out of the furnace through the opening C, and are conducted under a boiler or other apparatus which requires heat for its operation. If, by reason of accidental unequal settling of the bagasse, more draft should be necessary at some portion than at others of the furnace, the surplus draft in some of the chambers $b$ has freedom to pass through the openings $d$ toward the place where it is needed.

The furnace described is one of the larger class, wherein two or more grates $b$ in as many separate combustion-chambers, denominated "openings B," are used with advantage. One grate-chamber alone might be used; but it is best to have two, except in small furnaces, wherein one only would be necessary, and one wall D, which will stand centrally in reference to the grate $b'$, and the flame and air will divide and pass on each side of said wall, and the fire-chamber and grate will be arranged centrally in the front wall of the furnace A.

I am aware that bagasse-furnaces are sometimes provided with small grate-chambers B, wherein wood or coal is burned; but without my improvements they have proved to be without satisfactory results, so far as the purposes for which bagasse-furnaces are used are concerned. The great trouble in all other bagasse-burners is to make the bagasse burn freely and rapidly, because it packs in the center and against the walls of the chamber, so that the flame cannot pass through it, which trouble is obviated perfectly by my pinnacle and side columns, as those furnish openings or flues for the flame in the center and all around the chamber-wall.

Having described my invention, what I claim is—

1. In combination with the combustion-chamber wall of a bagasse-furnace, the inwardly-projecting columns H, with broad spaces between them, and having broad inner faces and broad sides, whereby the bagasse is prevented from packing in the corners or angles $p$, formed between the wall and columns, and passages for the flame and air to ascend from below are maintained, substantially as and for the purpose described.

2. The combination of the pinnacle I, columns H, and longitudinal walls D, substantially as described.

3. In a bagasse-furnace, the central pinnacle, I, provided with columns or wings, having a space all around it between its columns and the outer wall, and said pinnacle having a grated or other suitable support, whereby the bagasse which is introduced into the furnace is radially divided and distributed and prevented from packing centrally in the angles or corners of said pinnacle, and whereby a central draft through the bagasse is secured, substantially as described.

4. In a bagasse-furnace, the combination of the doors D', the walls D, having openings $d$, and the bridge E, having passages $e$, substantially as and for the purpose set forth.

5. The combination of the grate or grates $b'$ in a chamber or chambers provided with a draft door or doors, B', the ash-pit or ash-pits $b^2$, provided with a draft door or doors, F F', and the chamber of the furnace, provided with the pinnacle, the columns, the longitudinal walls, and draft door or doors D', substantially as set forth.

6. The walls D, provided with perforations $d$, in combination with the bagasse combustion-chamber provided with inwardly-extending columns H, having broad inner faces and also broad spaces between them, substantially as and for the purpose set forth.

7. The combination, with the bagasse combustion-chamber provided with the columns H, which have broad inner faces and also broad spaces between them, of a wall, D, and a grate, $b'$, the wall occupying a position about central of the grate, and the flame or fire from the grate caused to circulate on both sides thereof, substantially as set forth.

8. The ash-pit of a bagasse-furnace provided with longitudinal sustaining-walls D and bridge-wall E, whereby circulation-chambers $b$ and passages $e$ $e'$ are formed and a firm support for the pinnacle I afforded, substantially as set forth.

9. The bagasse-furnace having inwardly-extending columns H on the inner surface of its bagasse combustion-chamber, and provided with walls D and M in its ash-pit section, which, in conjunction with the bridge-wall E, serve as a grating and for forming circulation-chambers $b$ and spaces $e$ $e'$, substantially as and for the purpose set forth.

10. The grate or fire-bed of the bagasse combustion-chamber, together with the air and flame circulation chambers $b$, of the ash-pit section of the furnace, formed by longitudinal walls D, which rise from the ground, extend up above grates $b'$, and terminate on the plane of the fire-bed surface of the bagasse combustion-chambers, said walls of themselves or together with a tie at E forming the grated support for the burning bagasse, thereby avoiding the use of transverse arched grated surfaces between the walls from end to end, as heretofore, substantially as described.

WILLIAM LITTLEJOHN.

Witnesses:
ROBT. L. FENWICK,
B. CARLYLE FENWICK.